US012368917B2

(12) United States Patent
Flores Guerra

(10) Patent No.: US 12,368,917 B2
(45) Date of Patent: *Jul. 22, 2025

(54) DEVICES, SYSTEMS, AND METHODS FOR MULTI-USER SCREEN SHARING

(71) Applicant: DISH Network L.L.C., Englewood, CO (US)

(72) Inventor: Jesus Flores Guerra, Denver, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/390,901

(22) Filed: Dec. 20, 2023

(65) Prior Publication Data
US 2024/0146991 A1 May 2, 2024

Related U.S. Application Data

(63) Continuation of application No. 17/732,288, filed on Apr. 28, 2022, now Pat. No. 11,877,024.

(51) Int. Cl.
H04N 21/43 (2011.01)
(52) U.S. Cl.
CPC . H04N 21/43076 (2020.08); H04N 21/43079 (2020.08)
(58) Field of Classification Search
CPC ............... H04N 21/43076; H04N 21/43079
See application file for complete search history.

(56) References Cited

U.S. PATENT DOCUMENTS

| 9,654,769 | B2 | 5/2017 | Richardson et al. | |
|---|---|---|---|---|
| 11,372,524 | B1 | 6/2022 | Tarpey et al. | |
| 11,877,024 | B2* | 1/2024 | Flores Guerra | H04N 21/43079 |
| 2012/0092443 | A1* | 4/2012 | Mauchly | H04N 21/2665 348/E7.083 |
| 2012/0215833 | A1* | 8/2012 | Chen | H04L 65/612 709/203 |
| 2013/0250074 | A1* | 9/2013 | Teng | H04N 13/398 348/54 |
| 2014/0240445 | A1 | 8/2014 | Jaynes | |
| 2015/0254045 | A1* | 9/2015 | Drake | G06Q 30/0261 345/1.3 |
| 2015/0281769 | A1* | 10/2015 | Chiu | H04N 21/47 348/564 |
| 2017/0162182 | A1* | 6/2017 | Gaetje | G10K 11/16 |
| 2023/0353815 | A1 | 11/2023 | Guerra | |

* cited by examiner

Primary Examiner — Kyu Chae
(74) Attorney, Agent, or Firm — Perkins Coie LLP

(57) ABSTRACT

The present technology is generally directed to multi-user screen sharing. In some embodiments, a method for media content screen sharing includes receiving a first media content item selection from a first user and receiving a second media content item selection from a second user. The method can further include generating a multi-content video signal, wherein the multi-content video signal includes the selected first media content item and the selected second media content item. The multi-content video signal can be displayed to both the first user and the second user. The method can include causing a first electronic device of the first user to display a first portion of the multi-content video signal that corresponds to the selected first media content item, and causing a second electronic device of the second user to display a second portion of the multi-content video signal that corresponds to the selected second media content item.

22 Claims, 7 Drawing Sheets

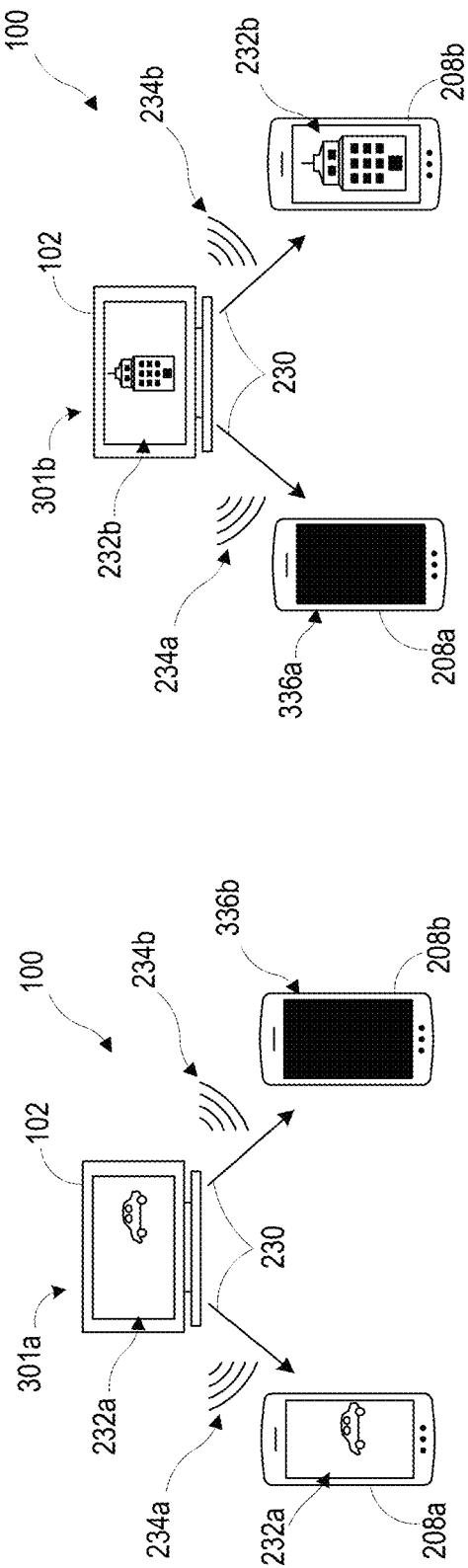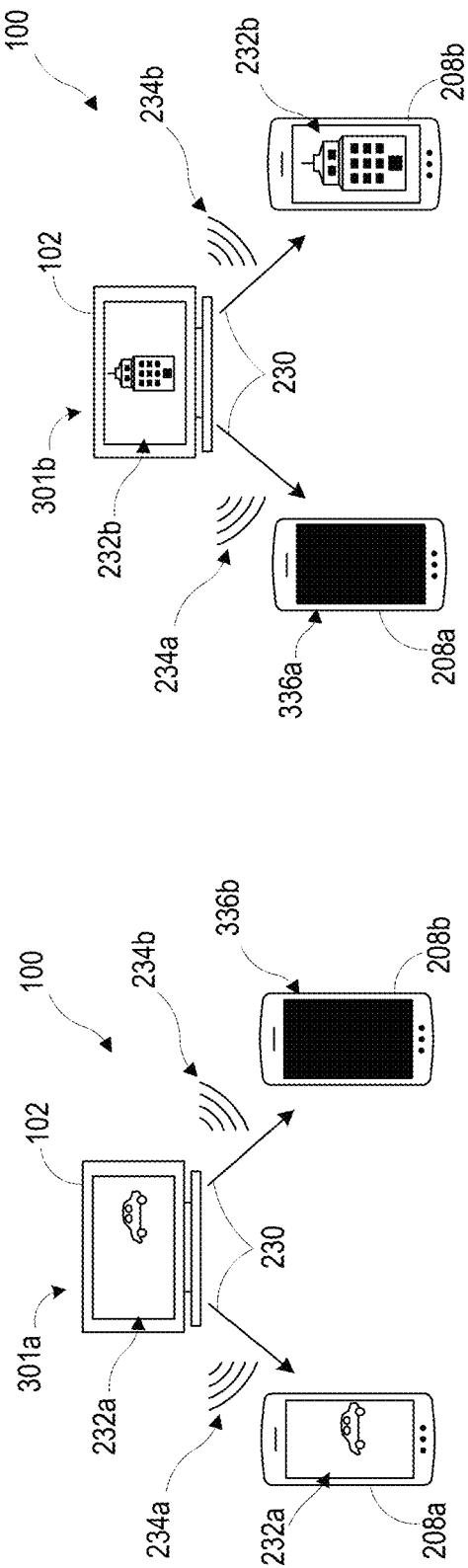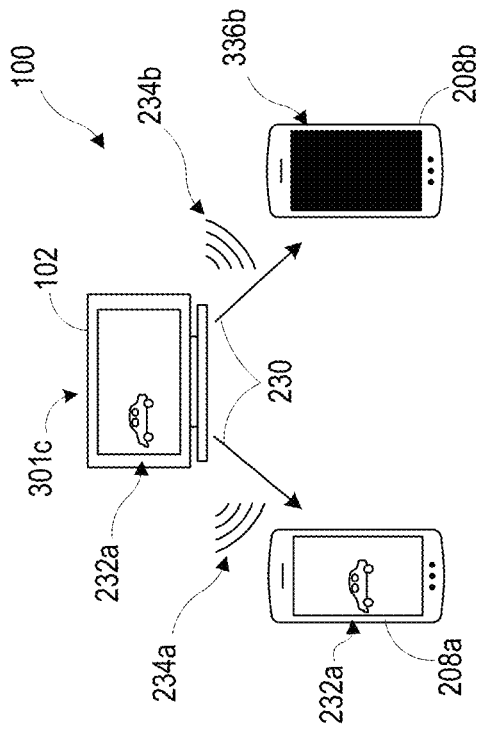

DEVICES, SYSTEMS, AND METHODS FOR MULTI-USER SCREEN SHARING

CROSS-REFERENCE TO RELATED APPLICATIONS

This patent application is a continuation of U.S. patent application Ser. No. 17/732,288, filed Apr. 28, 2022, entitled "DEVICES, SYSTEMS, AND METHODS FOR MULTI-USER SCREEN SHARING," which is incorporated herein by reference in its entirety.

BACKGROUND

Screen sharing, such as via split-screen or picture-in-picture video, can allow multiple users to view multiple video feeds using a single display device. However, conventional screen sharing techniques often divide the display device's screen into zones or sub-areas smaller than the size of the single display device, relegating individual video feeds to these various zones and displaying these individual video feeds to everyone viewing the display device. This can be distracting when, for example, multiple viewers each want to watch their respective content using the single display device and are uninterested in viewing the other viewer's content.

BRIEF DESCRIPTION OF THE DRAWINGS

FIGS. 3A-3C illustrate the system of FIG. 1 at first, second, and third times, respectively, in accordance with embodiments of the present technology.

Figure 1:
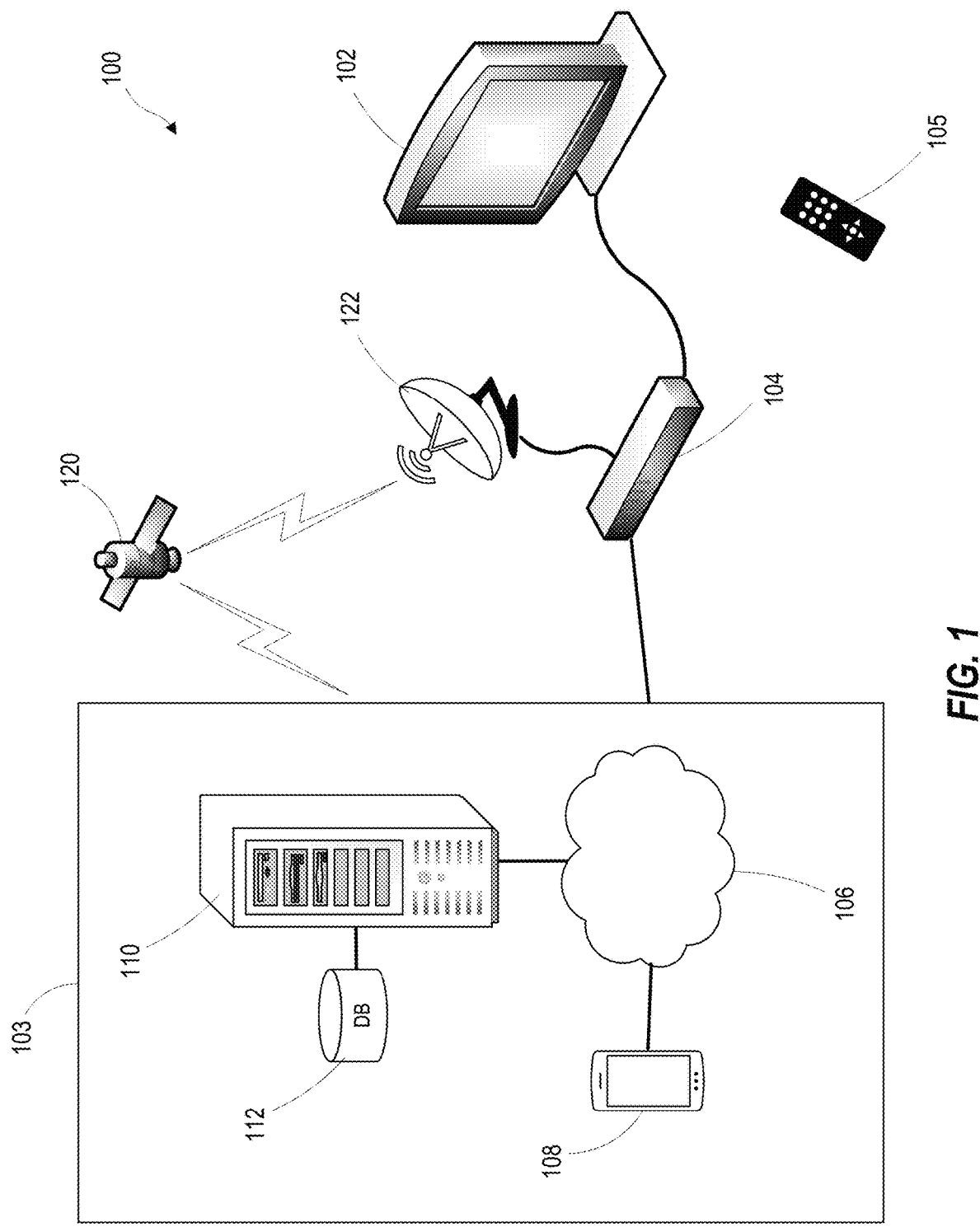
FIG. 1 is a block diagram of a system for presenting or displaying media content items in accordance with embodiments of the present technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

The present technology is generally directed to devices, systems, and methods for multi-user screen sharing. In some embodiments, a multi-user screen sharing system includes a set-top box, a television, and at least two electronic devices. Each of the electronic devices can be associated with a user. For example, a first user can have a first electronic device and a second user can have a second electronic device. Each of the users can select respective media content items (e.g., videos, video feeds, movies, television shows, television broadcasts, and the like) for viewing. For example, the first user can select a first media content item and the second user can select a second media content item. Each of the users' selections can be received by the set-top box. The set-top box can generate a multi-content video signal including the first media content item and the second media content item, and can cause the television to display the multi-content video signal to both the first and second users. In some embodiments, the set-top box can generate the multi-content video signal by interleaving video frames from the first and second media content items, such that the first and second media content items are displayed on the television in a time-division multiplexed format. For example, the odd-numbered frames of the multi-content video signal can correspond to the first multi-content video signal and the even-numbered frames of the multi-content video signal can correspond to the second multi-content video signal. Accordingly, in this example, the framerate of the multi-content video signal will be greater than (e.g., double) the frame rates of the respective first and second media content items. For example, if the first and second media content items each have a 30 Hz frame rate, the multi-content video signal can have a 60 Hz frame rate.

While the television is displaying the multi-content video signal, the users can use their respective electronic devices to selectively view their respective media content item selections. For example, each user's respective electronic device can capture light (e.g., the displayed multi-content video signal) from the television and de-interleave the captured light to display the user's selected media content item. In some embodiments, the set-top box can send sync signals to each of the user's devices to cause each device to display the portion of the multi-content video signal that corresponds to the user's selected media content item. The sync signals can be associated with the frame rate of each user's selected media content item. For example, for a 60 Hz multi-content video signal including two 30 Hz media content items, the set-top box can send sync signals to each user's electronic device to cause/instruct each user's electronic device to display the 30 Hz portion (e.g., the odd-numbered or even-numbered frames) of the 60 Hz multi-content video signal that correspond to each user's selected media content item. Accordingly, the selected media content items can be interleaved/multiplexed when displayed by the television and de-interleaved/de-multiplexed on the user's electronic devices. The electronic devices can include, for example, smartphones, and the users can view their respective media content item selections via their smartphone's cameras. Additionally, or alternatively, the electronic devices can include smart glasses, AR devices, VR devices, and the like.

Various embodiments of the systems and methods introduced above will now be described in further detail. The following description provides specific details for a thorough understanding and enabling description of at least these embodiments. One skilled in the relevant art will understand, however, that the techniques and technology discussed herein may be practiced without many of these details. Likewise, one skilled in the relevant art will also understand that the technology can include many other features not described in detail herein. Additionally, some well-known structures and/or functions associated with the present technology may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 is a block diagram of a system 100 for presenting or displaying media content items in accordance with embodiments of the present technology. The system 100 can include a television 102 or other display device, a set-top box (STB) 104, and a remote control 105. The system 100 can also include or be in communication with one or more media content sources 103. The media content sources 103 can include a server 110, a database 112, and/or optionally a cloud environment 106. Individual ones of the media content sources 103 can store or otherwise include one or more media content items, and/or can be configured to transmit individual ones of the media content items to the television 102 and/or the STB 104. Optionally, the system 100 and/or the media content sources 103 can include an electronic device 108. The electronic device 108 can be a desktop computer or a mobile device, such as a cellular telephone, a tablet computer, a smartwatch, smart glasses, a VR headset, or any other mobile device.

In some examples, the STB 104 can be in communication with a satellite-based television distribution system via a satellite dish 122. Satellite-based television distribution systems often include one or more satellites 120 and satellite transmission equipment (not shown). Although the system 100 is described with respect to a satellite-based distribution system, cable, IP-based, wireless, and broadcast focused systems are also possible. While only one satellite dish 122, STB 104, and television 102 (collectively referred to as "user equipment") are illustrated, it should be understood that multiple (e.g., tens, thousands, millions of) instances and types of user equipment may receive data and television signals from satellite-based television distribution systems (e.g., satellite 120).

Figure 2:
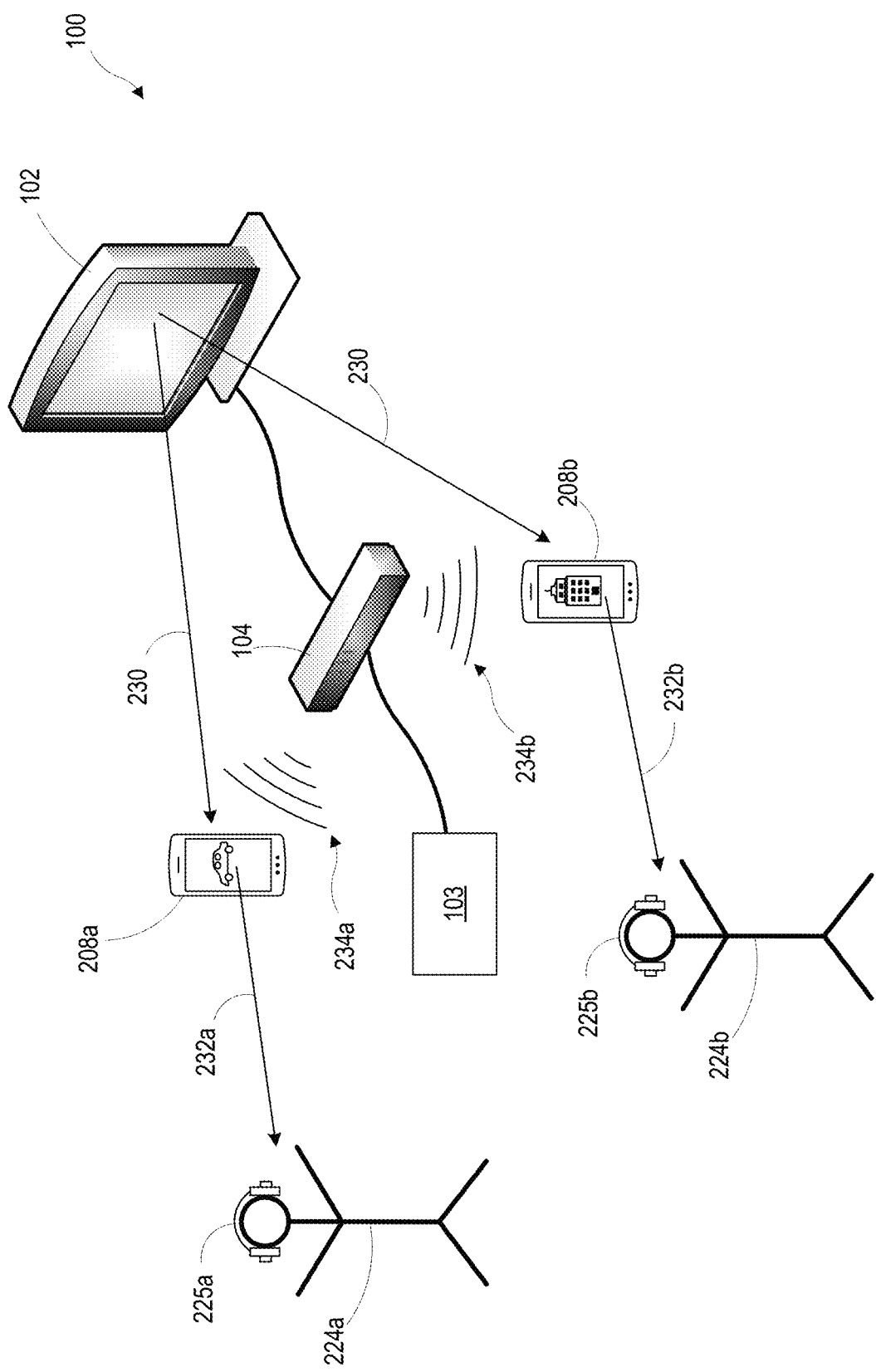
FIG. 2 is a block diagram illustrating the system of FIG. 1 displaying first and second media content items to first and second users, respectively, in accordance with embodiments of the present technology.

FIG. 2 is a block diagram illustrating the system 100 displaying first and second media content items 232a, 232b to first and second users 224a, 224b, respectively, in accordance with embodiments of the present technology. One or more of the media content sources 103 can communicate one or more media content items (e.g., videos, video feeds, movies, television shows, television broadcasts, and the like) to the STB 104 and television 102 (for example, via the satellite-based television distribution system, including the satellite dish 122 and satellite 120 of FIG. 1). The television 102 can then display the one or more media content items, for example, to the users 224a, 224b. Although in the illustrated embodiment the system 100 has two users 224a, 224b, in other embodiments the system 100 can have more users, such as at least four, six, any number therebetween, and/or any other suitable number of users. Additionally, or alternatively, the system 100 can have up to 12, 14, 16, or up to any other suitable number of users.

The television 102 is configured to display a multiplexed or multi-content video signal 230. The multi-content video signal 230 can include a plurality of individual media content items 232a-b. In the illustrated embodiment, the multi-content video signal 230 includes the first media content item 232a and the second media content item 232b (shown using correspondingly-numbered arrows in FIG. 2), which can be referred to collectively as "media content items 232." In other embodiments, the multi-content video signal 230 can include more than two media content items, such as at least three, four, five, or any other suitable number of media content items. Additionally, or alternatively, the multi-content video signal 230 can include up to 12, 14, 16, or any other suitable number of media content items. In these and other embodiments, the number of media content items within the multi-content video signal can be the same as or different than the number of users. In at least some embodiments, for example, each user can watch a respective media content item different from the media content items watched by other users. In other embodiments, one or more users can watch the same media content item. Additionally, or alternatively, the number of media content items included in the multi-content video signal 230 can be based at least partially on the frame rate of the display device and/or the frame rates of the individual media content items. For example, a display device with a 60 Hz frame rate could display a 60 Hz multi-content video signal including two 30 Hz media content items, a display device with a 120 Hz frame rate could display a 120 Hz multi-content video signal including four 30 Hz media content items and/or a 120 Hz multi-content video signal including two 60 Hz media content items, etc.

The individual media content items 232 can be interleaved, multiplexed (e.g., time-division multiplexed), or otherwise combined into the multi-content video signal 230 by the television 102, by the STB 104, by one or more of the media content sources 103, and/or by any other suitable element and/or component of the system 100. In some embodiments, the individual media content items 232 can be optically multiplexed to form the multi-content video signal, for example, by inserting one or more frames from the first media content item 232a between one or more frames from the second media content item 232b. Accordingly, in at least some embodiments, the odd-numbered frames (e.g., frames 1, 3, 5, 7, etc.) of the multi-content video signal 230 correspond to the first media content item 232a and the even-numbered frames (e.g., frames 2, 4, 6, 8, etc.) of the multi-content video signal 230 correspond to the second media content item 232b. This is described in detail below with reference to FIGS. 3A-3C.

The user's devices 208a, 208b can each be configured to selectively display (using, e.g., the display screens of the user's devices 208a, 208b) at least one of the media content items 232a, 232b from the multi-content video signal 230. In the illustrated embodiment, for example, the first user's device 208a is configured to display the first media content item 232a to the first user 224a and the second user's device 208b is configured to display the second media content item 232b to the second user 224b. In some embodiments, one or more of the users 224a, 224b can use respective headphones 225a, 225b, or any other suitable sound-emitting device, in communication with the user's devices 208a, 208b and/or the system 100 to hear the sound associated with the respective media content items 232a, 232b.

The system 100 (e.g., the STB 104, or any other suitable element of the system) can transmit respective display control or sync signals 234a, 234b to the user's devices 208a, 208b. In some embodiments, one or more of the sync signals 234a, 234b can be transmitted wirelessly, for example, via Wi-Fi or Bluetooth connectivity between the devices 208a, 208b and the system 100. Additionally, or alternatively, one or more of the sync signals 234a, 234b can be transmitted optically, for example, as a visual code or indicator included in the multi-content video signal 230, such as preceding one or more frames of the first and/or second media content items 232a, 232b. In these and other embodiments, one or more of the sync signals 234a, 234b can be transmitted using any other suitable transmission method or technique. In some aspects of the present technology, transmitting sync signals 234a, 234b to the user's electronic devices is expected to use less bandwidth than transmitting the user's respective media content items 232a, 232b to the user's electronic devices.

When received by the users' devices 208a, 208b, the sync signals 234a, 234b can cause or instruct each device 208a, 208b to display select frames or portions of the multi-content video signal 230. In the illustrated embodiment, for example, the first sync signal 234a instructs the first device 208a to display one or more of the frames of the multi-content video signal 230 that correspond to the first media content item 232a (e.g., the odd-numbered frames), and the second sync signal 234b instructs the second device 208b to display one or more of the frames of the multi-content video signal 230 that correspond to the second media content item 232b (e.g., the even-number frames). This is described in detail below with reference to FIGS. 3A-3C.

The system 100 can allow multiple users to watch different content using the same television. For example, the first user 224a may wish to watch the first media content item 232a and the second user may wish to watch the second media content 232b at the same time as the first user 224a watches the first media content item 232a. Each of the users 224a, 224b can request to view their respective media content items 232a, 232b, and the system 100 can combine the first and second media content items 232a, 232b into the multi-content video signal 230 and display the multi-content video signal 230 to both of the users 224a, 224b. The users 224a, 224b can view their respective media content items 232a, 232b via the user's respective electronic devices 208a, 208b, for example, via one or more cameras of the user's device's 208a, 208b. Each of the user's electronic devices 208a, 208b can be configured to display the respective user's media content item and block/filter out (e.g., not display) the other user's media content item. Although the user's electronic devices 208a, 208b are illustrated as smartphones, it will be appreciated that, in other embodiments, the electronic devices 208a, 208b can include tablets, smart glasses, AR headsets, VR headsets, and/or any other suitable electronic devices.

FIGS. 3A-3C illustrate the system 100 at first, second, and third times 301a-c, respectively, in accordance with embodiments of the present technology. The multi-content video signal 230 can be configured to display the constituent media content items on the television at their original, respective frame rates. For example, as described previously regarding FIG. 2, the individual frames of the first and second media content items 232a, 232b can be interleaved to create the multi-content video signal 230. Accordingly, because the multi-content video signal 230 includes multiple media content items 232a, 232b, the frame rate of the multi-content video signal 230 will be greater than (e.g., a combination of, a multiple of, etc.) the frame rate of the individual media content items 232a, 232b, and/or proportional to the number of individual media content items included in the multi-content video signal 230. For example, in some embodiments the first and second media content items 232a, 232b each have a frame rate of 30 Hz, and the multi-content video signal has a frame rate of 60 Hz, twice the respective frame rates of the first and second media content items 232a, 232b. Continuing with this example, the television 102 can display the multi-content video signal at 60 Hz, and the user's device 208a, 208b can display the respective first and second media content items at 30 Hz. Accordingly, the multi-content video signal can be configured to preserve the original frame rates of the individual media content items 232a, 232b.

The sync signals 234a, 234b can be coordinated with the frames from the multi-content video signal 230 being displayed on the television 102 at a given time. For example, the sync signals 234a, 234b can be configured based at least in part on the frame rate of the multi-content video signal 230 and/or the frame rates of the individual media content items 232a, 232b, such that the sync signals 234a, 234b can cause the respective devices 208a, 208b to display the respective media content items 232a, 232b. In at least some embodiments, for example, the sync signals 234a, 234b can cause/instruct the respective devices 208a, 208b to either display or block presentation of the individual frames of the multi-content video signal 230 based on which media content item 232a, 232b the device's users 224a, 224b (FIG. 2) want to view. By instructing/causing the devices 208a, 208b to alternate between displaying and blocking individual frames from the multi-content video signal 230 at a same frame rate as the respective first and second media content items 232a, 232b, the sync signals 234a, 234b can cause the respective devices 208a, 208b to display the respective first and second media content items 232a, 232b to the respective first and second users 224a, 224b (FIG. 2). In at least some embodiments, for example, instructing/causing the first user's device 208a to block the even-numbered frames of a 60 Hz multi-content video signal 230 including a first 30 Hz media content item 232a and a second 30 Hz media content item 232b can cause the first user's device 208a to display the odd-numbered frames (e.g., the first media content item 232a selection) of the 60 Hz multi-content video signal 230 at 30 Hz. Additionally, or alternatively, instructing/causing the first user's device 208b to display the odd-numbered frames of a 60 Hz multi-content video signal 230 can cause the first user's device 208a to display the odd-numbered frames of the 60 Hz multi-content video signal 230 at 30 Hz. The same applies to the second user's device 208b, but with selectively blocking the frames of the multi-content video signal 230 associated with the first media content item 232a and/or selectively displaying the frames of the multi-content video signal 230 associated with the second media content item 232b.

Referring to FIG. 3A, at the first time 301a, the multi-content video signal 230 is configured to display a first frame from the first media content item 232a on the television 102. The first sync signal 234a instructs/causes the first device 208a to display the first frame from the first media content item 232a to the first user 224a (FIG. 2), and the second sync signal 234b instructs/causes the second device 208b to display a blank or dark screen 336b, or to otherwise not display the first frame from the first media content item 232a shown on the television 102.

Referring to FIG. 3B, at the second time 301b (e.g., after or immediately following the first time 301a), the multi-content video signal 230 is configured to display a first frame from the second media content item 232b (e.g., the second frame of the multi-content video signal 230) on the television 102. The second sync signal 234b instructs/causes the second device 208b to display the first frame from the second media content item 232b to the second user 224b (FIG. 2), and the first sync signal 234a instructs/causes the first device 208a to display a blank or dark screen 336a, or to otherwise not display the first frame from the second media content item 232b shown on the television 102.

Referring to FIG. 3C, at the third time 301c (e.g., after or immediately following the second time 301b), the multi-content video signal 230 is configured to display a second frame from the first media content item 232a (e.g., a third frame of the multi-content video signal 230) on the television 102. The first sync signal 234a instructs/causes the first device 208a to display the second frame from the first media content item 232a to the first user 224a (FIG. 2), and the second sync signal 234b instructs/causes the second device 208b to display a blank or dark screen 336b, or to otherwise not display the second frame from the first media content item 232a shown on the television 102. The time between the first time 301a and the third time 301c can correspond to the frame rate of the first media content item 232a, and/or can be generally similar to or the same as the time between individual frames of the first media content item 232a. Accordingly, by alternatingly displaying and blocking individual frames from the multi-content video signal 230 at a same frame rate as the respective first and second media content items 232a, 232b, the system 100 can cause the respective devices 208a, 208b to display the respective first and second media content items 232a, 232b to the respective first and second users 224a, 224b (FIG. 2).

Figure 4:
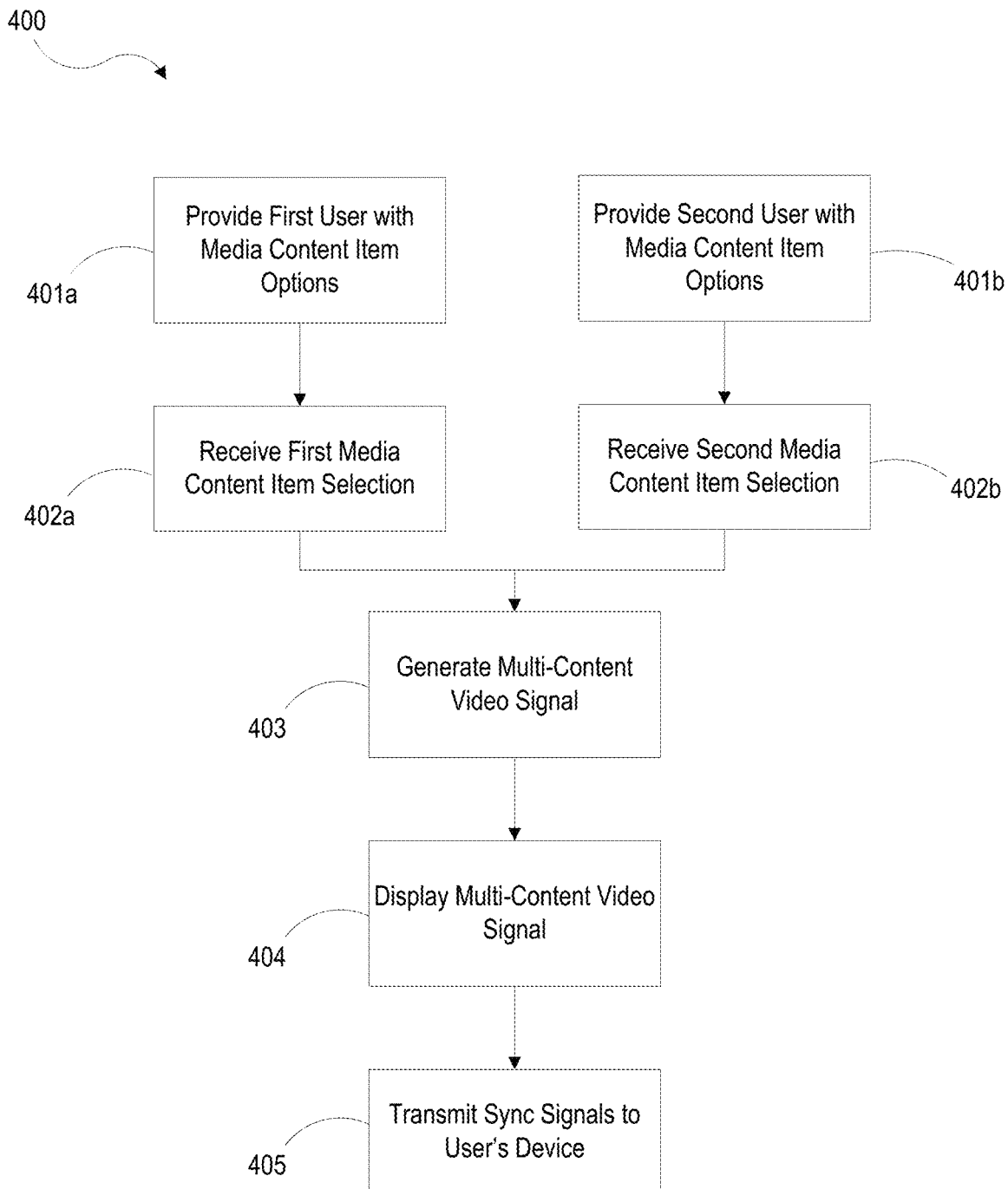
FIG. 4 is a flow diagram showing a representative method of operation of a processor-based system for displaying media contents items, in accordance with embodiments of the present technology.

FIG. 4 is a flow diagram showing a representative method 400 of operation of a processor-based system for displaying media contents items, in accordance with embodiments of the present technology. The method 400 is illustrated as a set of blocks, steps, operations, or processes 401-405. All or a subset of the steps 401-405 can be executed at least in part by various components of a system, such as the system 100 of FIGS. 1-3C. For example, all or a subset of the steps 401-405 can be executed at least in part by one or more set-top boxes, televisions, media content sources, satellite-based television distribution systems, and/or electronic devices. Additionally, or alternatively, any one or more of the steps 401-405 can be executed in accordance with the discussion above, and/or below regarding FIGS. 5-7. Many of the steps 401-405 of the method 400 are discussed in detail below with reference to FIGS. 1-3C for the sake of clarity and understanding. It will be appreciated, however, that the method 400 may be used with other media content systems in addition to those described herein.

At step 401a, the method 400 can include providing a first user with one or more media content items options, for example, for the first user's viewing. In some embodiments, one or more of the media content item options can be presented on the display device via a set-top box and/or on the first user's electronic device. At step 401b, the method 400 can include providing a second user with one or more media content item options for viewing. Step 401b can include at least some aspects that are generally similar or identical to step 402a. The second media content item selection can be presented (step 401b) before, during, and/or after the first media content item selection is presented (step 401a).

At step 402a, the method can include receiving a first media content item selection from the first user. In some embodiments, the first media content item selection can be received from a remote control associated with the set-top box. At step 402b, the method 400 can include receiving a second media content item selection from the second user. Step 402b can include at least some aspects that are generally similar or identical to step 402a. The second media content item selection can be received (step 402b) before, during, and/or after the first media content item selection is received (step 402a).

At step 403, the method 400 includes generating a multi-content video signal. The multi-content video signal can be generated based at least partially on the first media content item selection (step 402a) and the second media content item selection (step 402b). In some embodiments, generating the multi-content video signal can include multiplexing one or more frames of the first media content item (step 402a) with one or more frames of the second media content item (step 402b). In some embodiments, the multi-content video signal can be generated at least partially by a set-top box and/or a television.

At step 404, the method 400 can include displaying the multi-content video signal. Displaying the multi-content video signal can include displaying the multi-content video signal using a single display device, such as a single television. Additionally, or alternatively, displaying the multi-content video signal can include displaying the multi-content video signal to the first and second users. In these and other embodiments, displaying the multi-content video signal can include alternatingly and/or successively displaying one or more frames from the first and second media content items. In at least some embodiments, the first user and/or the second user can independently interact with the respective first and second media content items, for example, to pause, rewind, fast forward, and the like.

At step 405, the method 400 can include transmitting sync signals to the users' devices. Transmitting the sync signals can include transmitting a first sync signal to the first user's device and transmitting a second sync signal to the second user's device. Each of the sync signals can be configured to instruct/cause the associated users' device to display the respective user's media content item selection (step 402a, 402b). For example, the first sync signal sent to the first user's device can instruct/cause the first user's device to display the first media content item, and the second sync signal sent to the second user's device can instruct/cause the second user's device to display the second media content item. Accordingly, in some embodiments, transmitting the sync signals can include causing the users' devices to display the media content item selections (steps 401a, 401b).

Suitable System

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 5:
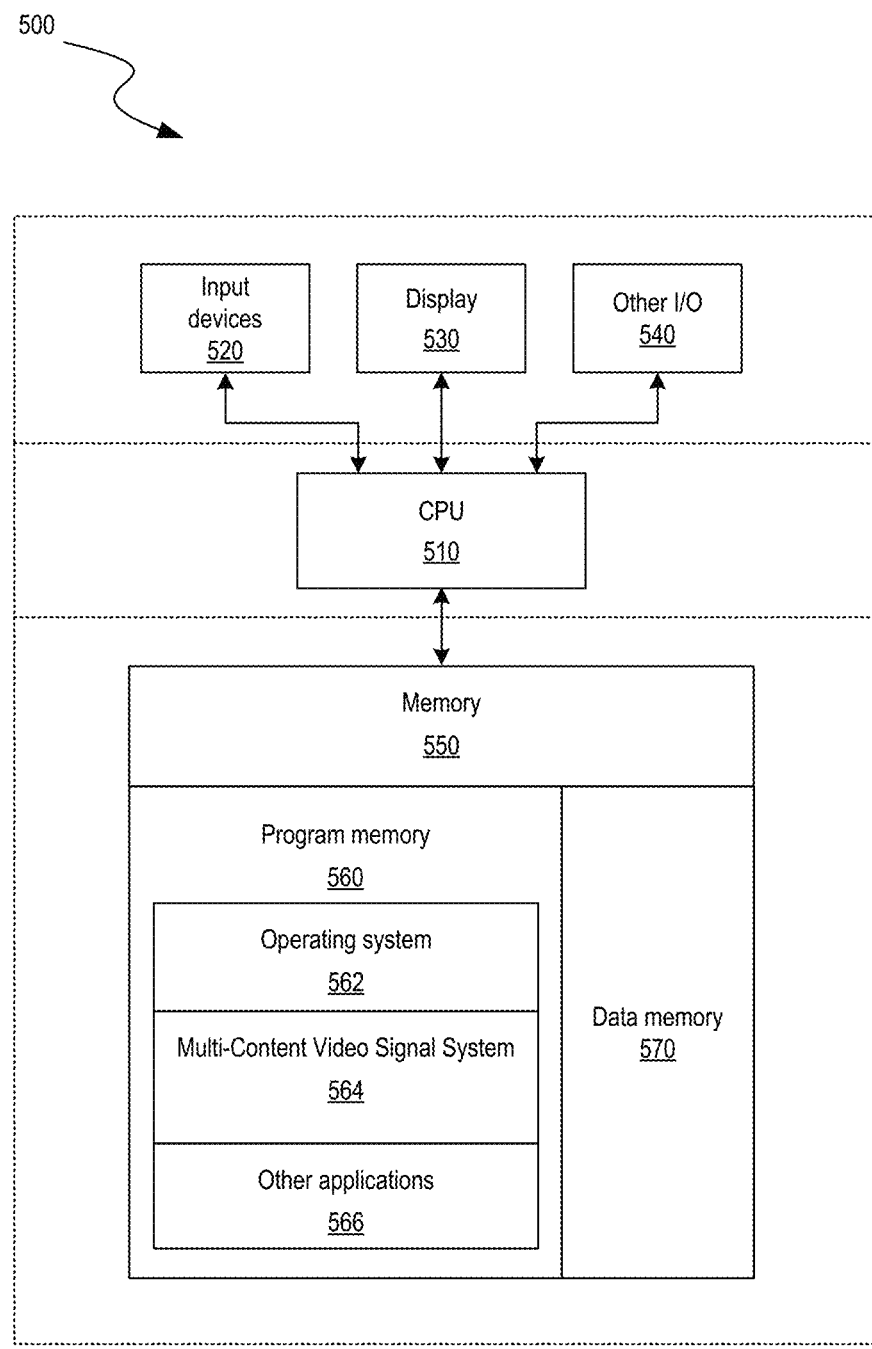
FIG. 5 is a block diagram illustrating an overview of devices on which at least some embodiments of the present technology can operate.

Several implementations are discussed below in more detail in reference to the figures. FIG. 5 is a block diagram illustrating an overview of devices on which at least some embodiments of the present technology can operate. The devices can comprise hardware components of a device 500. Device 500 can include one or more input devices 520 that provide input to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: televisions; mobile devices; an LCD display screen; an LED display screen; a projected, holographic, or augmented reality display (such as a heads-up display device or a head-mounted device); and so on. Other I/O devices 540 can also be coupled to the processor, such as a network card, video card, audio card, USB, FireWire or other external device, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The CPU 510 can have access to a memory 550. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as an operating system 562, a multi-content video signal application 564, and other application programs 566. Memory 550 can also include data memory 570 that can include broadcast schedule information, media content item libraries, media content item selections, media content item downloads, etc., which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
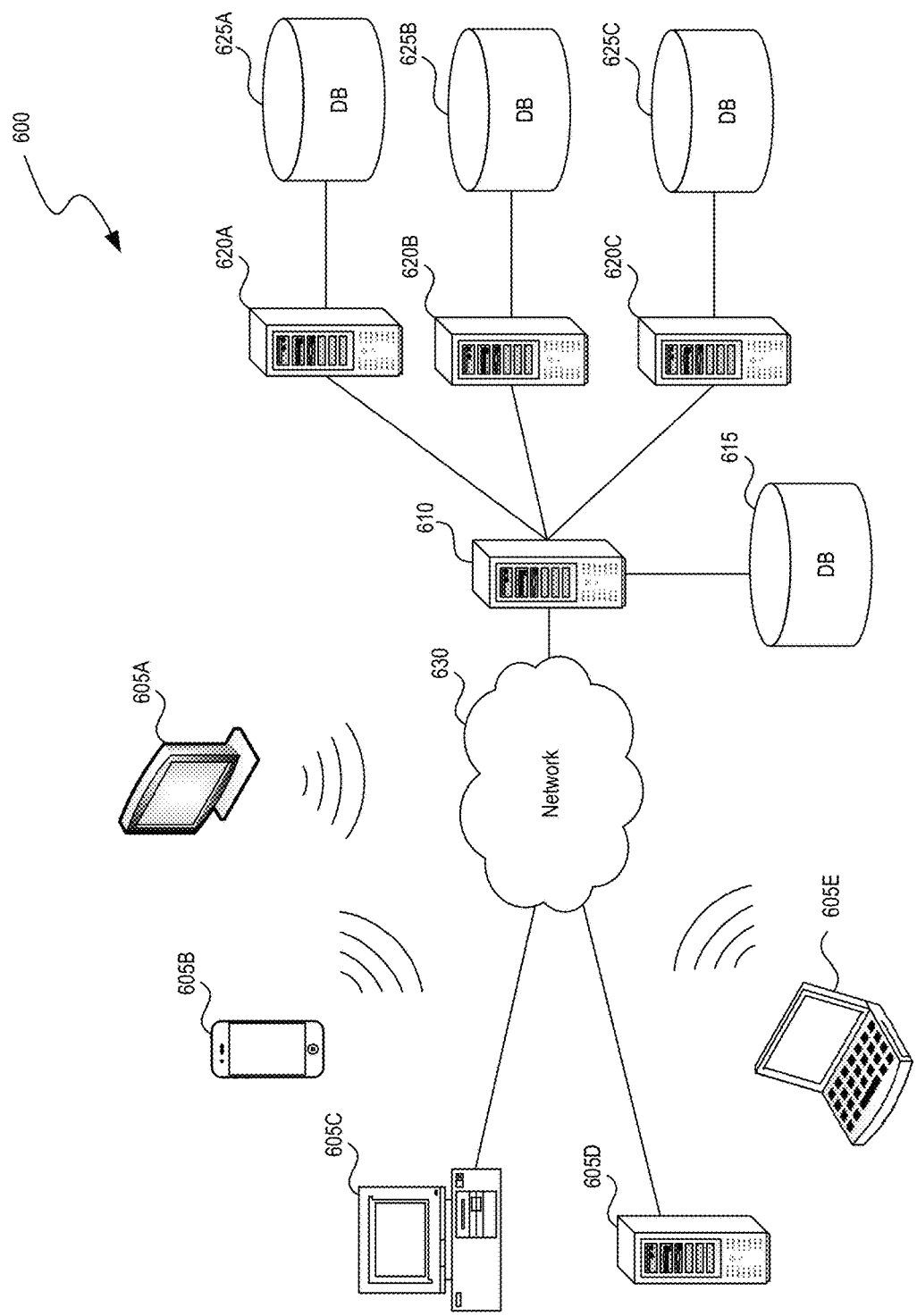
FIG. 6 is a block diagram illustrating an overview of an environment in which at least some embodiment of the present technology can operate.

FIG. 6 is a block diagram illustrating an overview of an environment 600 in which at least some embodiment of the present technology can operate. Environment 600 can include one or more client computing devices 605A-E, examples of which can include device 500. Client computing devices 605A-E can operate in a networked environment using logical connections through network 630 to one or more remote computers, such as a server computing device 610.

In some implementations, server computing device 610 can be an edge server that receives client requests and coordinates fulfillment of those requests through other servers, such as servers 620A-C. Server computing devices 610 and 620A-C can comprise computing systems, such as device 500. Though each server computing device 610 and 620A-C is displayed logically as a single server, server computing devices can each be a distributed computing environment encompassing multiple computing devices located at the same or at geographically disparate physical locations. In some implementations, each server computing device 620A-C corresponds to a group of servers.

Client computing devices 605A-E and server computing devices 610 and 620A-C can each act as a server or client to other server/client devices. Server 610 can connect to a database 615. Servers 620A-C can each connect to a corresponding database 625A-C. As discussed above, each server 620A-C can correspond to a group of servers, and each of these servers can share a database or can have their own database. Databases 615 and 625A-C can warehouse (e.g., store) information such as broadcast schedule information, media content items, media content item libraries, media content item selections, user preferences, and the like. Though databases 615 and 625A-C are displayed logically as single units, databases 615 and 625A-C can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. Network 630 may be the Internet or some other public or private network. Client computing devices 605A-E can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Figure 7:
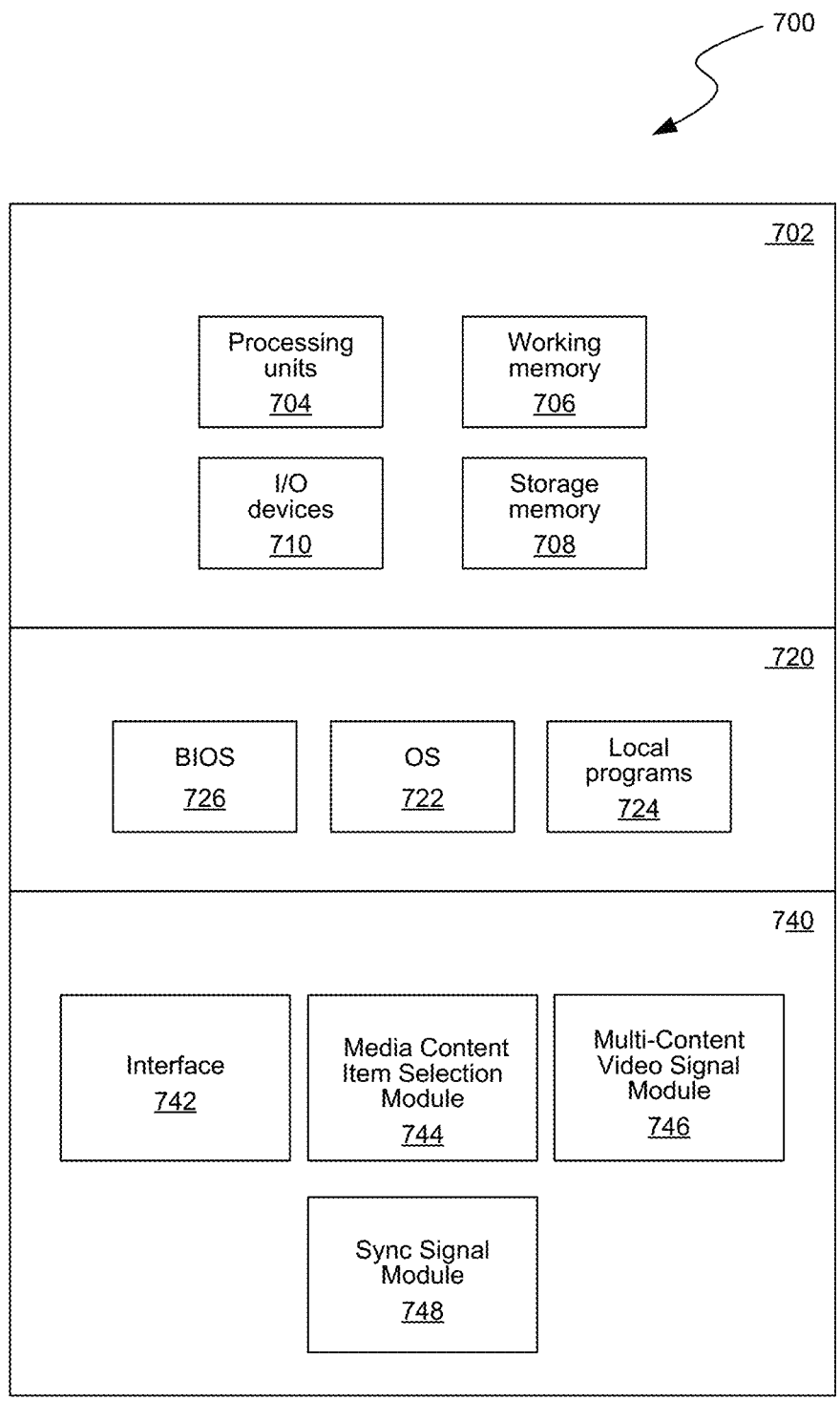
FIG. 7 is a block diagram illustrating components which can be used in a system employing at least some embodiments of the present technology.

FIG. 7 is a block diagram illustrating components 700 which can be used in a system employing at least some embodiments of the present technology. The components 700 include hardware 702, general software 720, and specialized components 740. As discussed above, a system implementing the disclosed technology can use various hardware, including processing units 704 (e.g., CPUs, GPUs, APUs, etc.), working memory 706, storage memory 708, and input and output devices 710. Components 700 can be implemented in a client computing device such as client computing devices 605A-E or on a server computing device, such as server computing device 610 or 620A-C.

General software 720 can include various applications, including an operating system 722, local programs 724, and a basic input output system (BIOS) 726. Specialized components 740 can be subcomponents of a general software application 720, such as local programs 724. Specialized components 740 can include: a media content item selection module 744, which can provide media content item options (steps 401*a*, 401*b*) and/or receive media content item selections (steps 402*a*, 402*b*); a multi-content video signal module 746, which can generate a multi-content video signal (Step 403) and/or cause the multi-content video signal to be displayed (step 404); a sync signal module 748, which can transmit sync signals to a user's device (step 405); and/or components that can be used for transferring data and controlling the specialized components, such as interface 742. In some implementations, components 700 can be in a computing system that is distributed across multiple computing devices or can be an interface to a server-based application executing one or more of specialized components 740.

Those skilled in the art will appreciate that the components illustrated in FIGS. 5-7 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for improved media content screen sharing, comprising:
   generating, by a television signal receiver communicatively coupled to a display device, a first mobile phone and a second mobile phone, a video signal including a first media content item and a second media content item;
   transmitting, by the television signal receiver, the video signal to the display device; transmitting, by the television signal receiver, the video signal to the first mobile phone and the second mobile phone;
   generating, by the television signal receiver and in connection with controlling the generated video signal, and transmitting to the first mobile phone a first display sync signal comprising a first set of instructions that cause the first mobile phone to (i) display a first portion of the video signal corresponding to the first media content item and (ii) prevent display of a second portion of the video signal corresponding to the second media content item; and
   generating, by the television signal receiver and in connection with controlling the generated video signal, and transmitting to the second mobile phone a second display sync signal comprising a second set of instructions that cause the second mobile phone to (i) display the second portion of the video signal corresponding to the second media content item and (ii) prevent display of the first portion of the video signal.

2. The method of claim 1 wherein causing the first mobile phone to display the first portion of the video signal includes receiving a first display sync signal via the first mobile phone, and wherein causing the second mobile phone to display the second portion of the video signal includes receiving a second display sync signal via the second mobile phone.

3. The method of claim 1 wherein the first display sync signal is associated with a first frame rate of the first media content item, and wherein the second display sync signal is associated with a second frame rate of the second media content item.

4. The method of claim 1 wherein the video signal includes a plurality of frames, wherein individual ones of the plurality of frames are from the first media content item or the second media content item, and wherein:
   causing the first mobile phone to display the first portion of the video signal includes causing the first mobile phone to selectively display one or more of the plurality of frames of the video signal from the first media content item, and
   causing the second mobile phone to display the second portion of the video signal includes causing the second mobile phone to selectively display one or more of the plurality of frames of the video signal from the second media content item.

5. The method of claim 1 wherein receiving the video signal includes receiving one or more first frames of the first media content item interleaved with one or more second frames of the second media content item.

6. The method of claim 1 wherein:
   the video signal includes one or more odd-numbered frames and one or more even-numbered frames,
   the one or more odd-numbered frames include one or more first frames from the first media content item, the one or more even-numbered frames include one or more second frames from the second media content item, and receiving the video signal includes receiving a first one of the one or more odd-numbered frames and receiving a second one of the one or more even-numbered frames.

7. The method of claim 1 wherein the first media content item has a first frame rate, wherein the second media content item has a second frame rate, and wherein receiving the video signal includes receiving the video signal at a third frame rate greater than the first frame rate or the second frame rate.

8. The method of claim 7 wherein the third frame rate is at least double the first frame rate or the second frame rate.

9. The method of claim 1, wherein the video signal is received by at least one of the first mobile phone or the second mobile phone via a first communication channel different from a second communication channel used to receive the respective first set of instructions or second set of instructions.

10. A system for improved media content screen sharing, the system comprising:
   a first mobile phone;
   a second mobile phone;
   a display device; and
   a television signal receiver communicatively coupled to the display device, the first mobile phone, and the second mobile phone, and configured to:
      generate a video signal including a first media content item and a second media content item;
      transmit the video signal to the display device;
      transmit the video signal to the first mobile phone and the second mobile phone;
      generate, in connection with controlling the generated video signal, and transmit to the first mobile phone a first display sync signal comprising a first set of instructions that cause the first mobile phone to (i) display a first portion of the video signal and (ii) prevent display of a second portion of the video signal, wherein the first portion corresponds to a first media content item and the second portion corresponds to a second media content item; and
      generate, in connection with controlling the generated video signal, and transmit to the second mobile phone a second display sync signal comprising a second set of instructions that cause the second mobile phone to (i) display the second portion of the video signal and (ii) prevent display of the first portion of the video signal.

11. The system of claim 10 wherein the television signal receiver is further configured to (i) transmit a first display sync signal to the first mobile phone to cause the first mobile phone to display the first portion of the video signal, and (ii) transmit a second display sync signal to the second mobile phone to cause the second mobile phone to display the second portion of the video signal.

12. The system of claim 10 wherein the first display sync signal is associated with a first frame rate of the first media content item, and wherein the second display sync signal is associated with a second frame rate of the second media content item.

13. The system of claim 10 wherein the first media content item has a first frame rate, wherein the second media content item has a second frame rate, and wherein the video signal has a third frame rate greater than the first frame rate or the second frame rate.

14. The system of claim 10 wherein the video signal includes one or more first frames from the first media content item interleaved with one or more second frames from the second media content item.

15. The system of claim 10 wherein the first portion of the video signal includes one or more first frames from the first media content item, wherein the second portion of the video signal includes one or more second frames from the second media content item, and wherein the television signal receiver is configured to:
   cause the first mobile phone to selectively display at least one of the one or more first frames; and
   cause the second mobile phone to selectively display at least one of the one or more second frames.

16. The system of claim 10, wherein the television signal receiver includes a set of communicatively coupled set-top boxes.

17. One or more non-transitory computer-readable media storing computer-executable instructions that, when executed by one or more processors associated with a television signal receiver communicatively coupled to a display device, a first mobile phone, and a second mobile phone, cause the one or more processors to perform operations comprising:
   generating, by the television signal receiver, a video signal including a first media content item and a second media content item;
   transmitting, by the television signal receiver, the video signal to the display device;
   transmitting, by the television signal receiver, the video signal to the first mobile phone and the second mobile phone;
   generating, by the television signal receiver and in connection with controlling the generated video signal, and transmitting to the first mobile phone a first display sync signal comprising a first set of instructions that cause the first mobile phone to (i) display a first portion of the video signal corresponding to a first media content item and (ii) prevent display of a second portion of the video signal corresponding to a second media content item; and
   generating, by the television signal receiver and in connection with controlling the generated video signal, and transmitting to the second mobile phone a second display sync signal comprising a second set of instructions that cause the second mobile phone to (i) display the second portion of the video signal and (ii) prevent display of the first portion of the video signal.

18. The one or more non-transitory computer-readable media of claim 17 wherein causing the first mobile phone to display the first portion of the video signal includes transmitting a first display sync signal to the first mobile phone, and wherein causing the second mobile phone to display the second portion of the video signal includes transmitting a second display sync signal to the second mobile phone.

19. The one or more non-transitory computer-readable media of claim 17 wherein the first display sync signal is associated with a first frame rate of the first media content item, and wherein the second display sync signal is associated with a second frame rate of the second media content item.

20. The one or more non-transitory computer-readable media of claim 17 wherein the first media content item has a first frame rate, wherein the second media content item has a second frame rate, and wherein the video signal has a third frame rate that is at least double the first frame rate or the second frame rate.

21. The one or more non-transitory computer-readable media of claim 17, further comprising interleaving one or more first frames of the first media content item with one or more second frames from the second media content item to generate the video signal.

22. The one or more non-transitory computer-readable media of claim 17 wherein:
- the video signal includes one or more odd-numbered frames and one or more even-numbered frames,
- the first media content item includes one or more first frames,
- the second media content item includes one or more second frames, and
- the operations further comprise combining the first media content item with the second media content item to generate the video signal such that (i) individual ones of the one or more odd-numbered frames include individual ones of the one or more first frames, and (ii) individual ones of the one or more even-numbered frames include individual ones of the one or more second frames.

* * * * *